A. J. MEEKS.
GRAIN HEADER AND CONVEYER.
APPLICATION FILED MAR. 21, 1913.
1,092,735.
Patented Apr. 7, 1914.
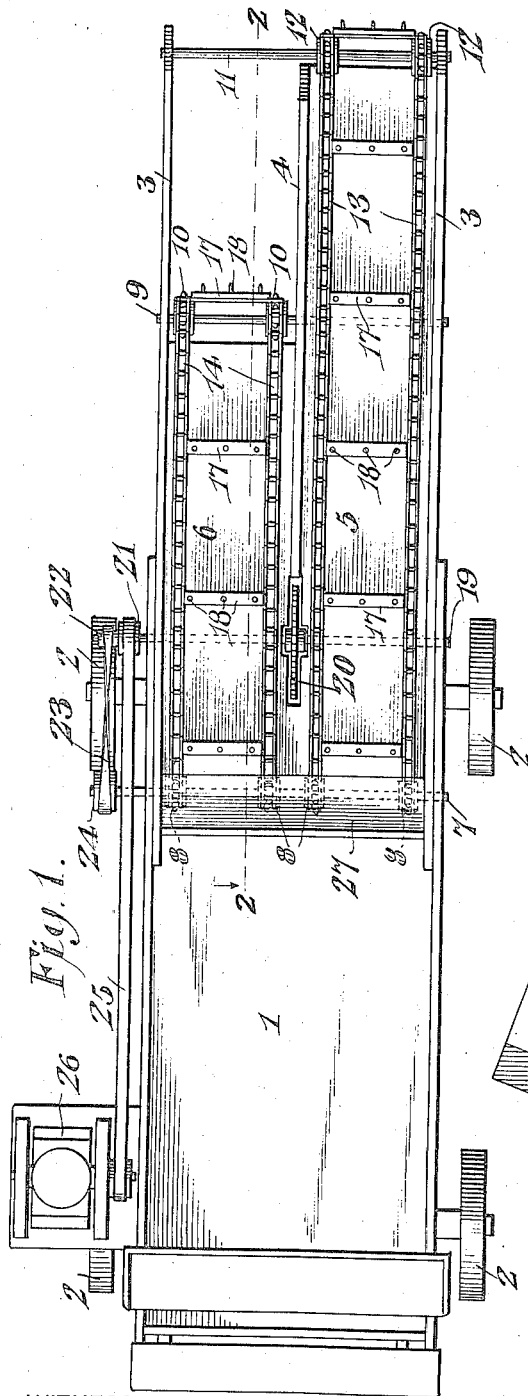
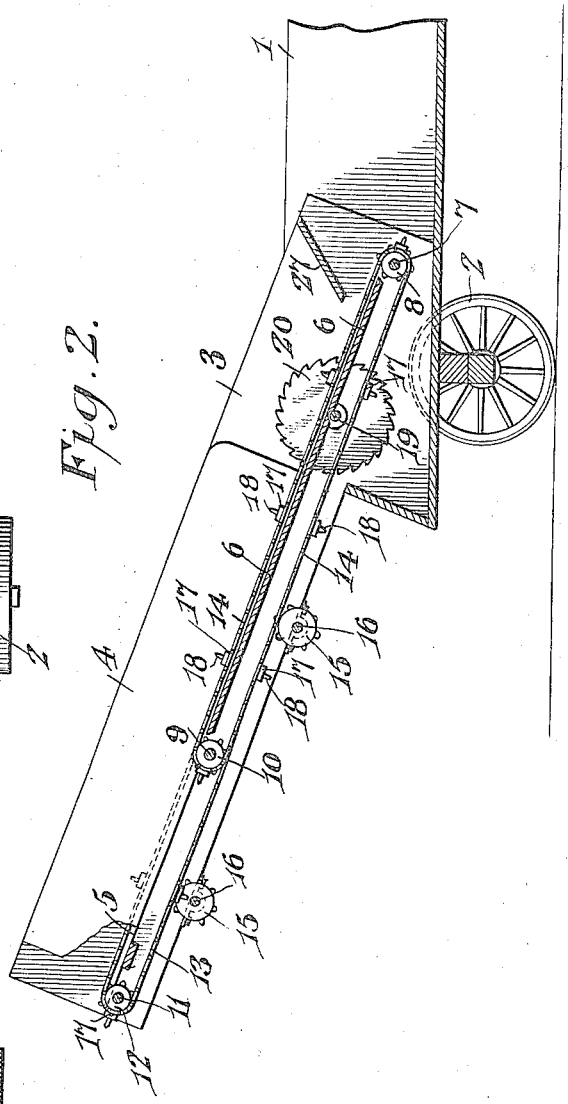
WITNESSES
Jas. K. McCathran
F. T. Chapman.
Anna J. Meeks, INVENTOR
BY C. G. Siggers
ATTORNEY

UNITED STATES PATENT OFFICE.

ANNA J. MEEKS, OF JENNINGS, LOUISIANA, ASSIGNOR OF ONE-HALF TO JOHN WILLIAM MEEKS, OF JENNINGS, LOUISIANA.

GRAIN HEADER AND CONVEYER.

1,092,735.　　　　　　Specification of Letters Patent.　　Patented Apr. 7, 1914.

Application filed March 21, 1913. Serial No. 755,904.

*To all whom it may concern:*

Be it known that I, ANNA J. MEEKS, a citizen of the United States, residing at Jennings, in Jefferson Davis parish and State of Louisiana, have invented a new and useful Grain Header and Conveyer, of which the following is a specification.

This invention has reference to improvements in headers and conveyers for grain in the bundle, and is designed more particularly for separating the head ends of bundles of rice from the butt ends, it often happening that the standing bundles of rice in the field become soaked with water at the butt ends, while the head ends are dry, and it is desirable to separate these wet butts from the heads of the rice, so that only the dry material will reach the threshing machine.

In accordance with the present invention there is provided a vehicle capable of being moved from place to place in order to gather up the bundles of grain and this vehicle carries an elevating conveyer which may be caused to direct the head ends of the bundles to the threshing machine while the butt ends which have been severed from the head ends are directed elsewhere for such disposition as may be desired. The vehicle is purposely mounted so that the body thereof is low, thereby facilitating the placing of the bundles in the vehicle and when the threshing machine is reached the vehicle is very readily adjusted so that the grain may be lifted from the low body to a sufficient elevation to reach the intake of the threshing machine. In order to operate the elevating conveyer which may or may not deliver directly to the threshing machine the vehicle carries a prime mover preferably in the form of an explosion engine, and since the work to be done is not heavy this engine may be of comparatively small power, say three or four horse power. Not only must the prime mover drive the conveyers, of which there are two, but must impart motion to a saw or cutter designed to engage the bundles of grain and sever the butt ends from the head ends. The elevating conveyers are placed side by side and may be driven simultaneously, one of the conveyers being longer than the other and reaching to a greater height. The arrangement of the parts is such that a bundle of grain, say of rice, when placed transversely of the respective runs of the two conveyers, will engage both conveyers and be moved thereby at the same speed at both ends, while the flights of the conveyers are so constructed as to force the bundles against the cutting member placed intermediately of the conveyers, thus severing each bundle into two parts at a point about midway of the bundle, but at a sufficient distance from the head end of the bundle to avoid directing any of the grain to that conveyer carrying the butt ends. The two conveyers from the cutter to the discharge point of the longer and higher conveyer are separated by a suitable wall or partition so that there may be no mixture of the two severed parts of the bundle and the shorter conveyer may deliver at its higher end into a wagon or upon the ground, so that the wet ends of the bundles may be readily carried away while the dry ends are either delivered directly to the threshing machine or other disposition is made of them.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a plan view of an apparatus constructed in accordance with the present invention. Fig. 2 is a section on the line 2—2 of Fig. 1, with parts broken away to exhibit some parts which would otherwise be hidden.

In the drawings there is shown a wagon body 1 mounted upon wheels 2 and while not obligatory it is preferred that the wheels and wagon body be so related that the wagon body is quite close to the ground and considerably closer than it is customary to mount wagon bodies.

At what may be termed the tail end of the wagon body there are secured side boards 3 inclining away from the tail end of the body to a suitably high point with relation to the body, and these side boards constitute the side members of an elevating conveyer. At a point substantially midway between the side boards 3 is a wall or partition 4 commencing at a point some little distance from the lower ends of the side boards and continued to substantially a point coincident with the upper ends of the side boards, thus dividing the conveyer structure into two conveyer channels, one of which is provided with a bottom member 5 and the other with a bottom member 6, the bottom member or floor 5 extending to substantially the upper end of the corresponding channel, while the other bottom member 6 terminates at a considerable distance from said upper end.

Mounted in transverse relation to the elevator structure at the lower ends of the floor or bottom members 5 and 6 is a shaft 7 upon which sprocket wheels 8 are secured in suitably spaced relation. At the upper end of the shorter flooring 6 is another transverse shaft 9 having sprocket wheels 10 thereon while at the upper end of the more extended flooring 5 is still another transverse shaft 11 having sprocket wheels 12 thereon. The sprocket wheels 8 on the shaft 7 are in part in line with the sprocket wheels 12 on the shaft 11 and in part in line with the sprocket wheels 10 on the shaft 9, and these alined sprocket wheels are connected by chains 13 and 14 shown as arranged in pairs, there being two chains 13 within the channel floored by the bottom member 5 and two chains 14 within the channel floored by the bottom member 6.

The lower runs of the chains are supported by idler sprockets 15 mounted on shafts 16 below such lower runs, so that the chains will not sag to any material extent and each pair of chains carries flights 17 from which project pins 18 or other suitable engaging devices.

Traversing the conveyer structure below the level of the floor members 5 and 6 and at a higher point than the shaft 7 is another shaft 19 upon which is mounted a circular saw or cutter 20 in line with the lower end of the partition 4. This shaft 19 projects at one end beyond the side of the vehicle body and there carries pulleys 21, 22. The pulley 22 is connected by a belt 23 to a pulley 24 on the shaft 7 while the pulley 21 is connected by a belt 25 to a prime mover 26 which may be considered as an explosion engine of any suitable type and appropriately mounted on the wagon body 1. At the lower end of the conveyers is an apron 27.

The vehicle may be moved by horse or by power to such points as may be found necessary in order to gather up a load of bundles of grain and when this is accomplished the vehicle is moved to a threshing machine or to any other desired point when the engine 26 may be set in motion, thus imparting motion to the shaft 19 and causing the cutter 20 to rotate. The motion of the shaft 19 is transmitted by the belt 23 to the shaft 7 and the pulleys may be so proportioned that while a comparatively high speed is imparted to the cutter 20 a slower movement is imparted to the sprocket wheels 8 and by them to the two conveyers but the speed of these conveyers should be alike. An operator places the bundles of rice or other grain upon the two conveyers, so that the butt ends are upon the shorter conveyer and the head ends are upon the longer conveyer and as the two conveyers move synchronously the bundles are carried by the flights 17 into engagement with the cutter 20 which may be in the form of a circular saw. The continued movement of the conveyers forces the bundle of grain against the saw which quickly severs it into two parts, one part of which remains upon the shorter conveyer and the other part of which remains upon the longer conveyer, and as soon as the saw is passed, said saw keeping the severed portions of the bundle apart, the wall or web 4 is reached and this rising from the bottom of the conveyer channels intermediate thereof maintains the separation of the severed parts of the bundle. The wet butt ends of the grain reach the upper end of the shorter conveyer and fall therefrom into a waiting wagon or upon the ground, while the longer conveyer carries the dry heads of the grain a sufficiently farther distance to prevent any likelihood of any mixture of the two parts of the bundle and if the device be in proper relation to a threshing machine the dry heads of the grain are delivered directly thereto or if some other disposition is to be made of these dry heads they may be carried to a suitable point of deposition with the knowledge that there is no likelihood of mixture with the wet grain.

The header and conveyer attachment may be secured to the wagon frame, or any other vehicle, in any way, either in the position shown or to discharge the dry grain to either side of or upon the vehicle.

What is claimed is:—

1. An apparatus for the purpose described, comprising two elevating conveyers, one of greater linear extent than the other and having their lower or receiving ends in the same plane, means for actuating said conveyers synchronously, a rotatable cutter located intermediately of the conveyers adjacent to the receiving ends thereof, and a wall or partition separating the conveyers and extending from the cutter to the discharge end of the longer conveyer.

2. An apparatus for the purpose described, comprising a pair of adjacent elevating conveyers of different lengths with an intermediately arranged cutter at the lower or receiving ends of the conveyers, and said conveyers having the upper or discharge end of one stopping short of the upper or discharge end of the other by a distance substantially that of the difference in lengths of the conveyers, and means for preventing material on one conveyer from reaching the other between the severing means and the discharge end of the longer conveyer.

In testimony that I claim the foregoing as my own, I have hereto affixed my signature in the presence of two witnesses.

Mrs. ANNA J. MEEKS.

Witnesses:
 JOHN GAMBLE,
 L. O. JACKSON.